United States Patent

Lutzker

[15] 3,657,700

[45] Apr. 18, 1972

[54] FORWARD ERROR CORRECTING SYSTEM

[72] Inventor: Lawrence Lutzker, Palo Alto, Calif.

[73] Assignee: American Computer Communications Company, Inc.

[22] Filed: July 13, 1970

[21] Appl. No.: 54,505

[52] U.S. Cl. ....................340/146.1

[51] Int. Cl. ....................G08c 25/00, G06f 11/00

[58] Field of Search ....................340/146.1, 172.5

[56] References Cited

UNITED STATES PATENTS

| | | | |
|---|---|---|---|
| 3,372,376 | 3/1968 | Helm | 340/146.1 |
| 3,496,549 | 2/1970 | Tong | 340/146.1 X |
| 3,506,961 | 4/1970 | Abramson et al. | 340/146.1 |

*Primary Examiner*—Charles E. Atkinson

*Attorney*—Dressler, Goldsmith, Clement and Gordon

[57] ABSTRACT

An adaptively coded forward error correcting data communications system having the capability of varying error correction potential without the necessity of variation in codes and without the necessity of increasing the percentage redundancy of transmitted data by adaptively varying the block length of the data transmitted utilizing varying data block lengths and in which more than a single block of data may be processed in over-lapping time relationship without full duplication of circuitry while permitting decoding and evaluation of the transmitted and received message.

8 Claims, 5 Drawing Figures

Patented April 18, 1972

3,657,700

3 Sheets-Sheet 1

INVENTOR

Lawrence Lutzker

BY Dressler, Goldsmith Clement & Gordon

ATTORNEYS

INVENTOR

Lawrence Lutzker

BY Dressler, Goldsmith, Clement & Gordon

ATTORNEYS

Patented April 18, 1972 | 3,657,700

3 Sheets-Sheet 3

INVENTOR
Lawrence Lutzker
BY Dunlap, Goldsmith, Clement & Gordon
ATTORNEYS

FORWARD ERROR CORRECTING SYSTEM

BACKGROUND OF INVENTION

With the increasing sophistication of computer systems, including the so-called "third generation" large computers and time sharing systems, and with the burgeoning communication of data between date processing systems over short and long length communications links, a complete re-evaluation of procedures for insuring correct data transmission is occurring. Initially, when the data communication volume was low, and maximum utilization of channel capacity was not of great concern, it was felt that the economics of added hardware cost and system design dictated the most efficient and practical method of insuring correct receipt of transmitted data was to check for errors and to retransmit the data in the event that errors occurred.

However, with the increased data transmission load, with the increased cost of tying up data processing systems and with the ever present desire for faster communications, it is readily apparent that this approach no longer suffices.

The alternative to repeated retransmission of the data until a message is correctly received, is to effect some type of "forward error correction." Unfortunately, many traditional approaches to data error correction were not designed for data transmission. Apparently, the result of this carry over in approach has been that data forward error correction data transmission systems while possibly capable of correcting errors have been so complicated and expensive that their utilization has been self-defeating in that the cost of such forward error correction remains greater than the use of retransmission procedures.

In U.S. Pat. No. 3,506,961, entitled "Adaptively Coded Data Communications System," and assigned to the same assignee as this application, there is disclosed and claimed a forward error correction system which has the capability of forward error correction under varying transmission channel noise conditions without the necessity of varying codes and without the necessity of changing the percentage redundancy in the data being transmitted. This system is able not only to transmit data correctly, efficiently and at lower cost, but the simplicity of the approach suggests the desirability of relatively simple system design to implement the efficiencies obtained by the error correction capabilities disclosed and claimed in that patent.

In U.S. Pat. No. 3,506,961, which patent is specifically incorporated herein by reference as a part of the disclosure of this application, there is disclosed an adaptive forward error correction data transmission system in which data to be transmitted is processed through and encoder including a feedback register having a plurality of stages interconnected in accordance with a selected code, and an encoder buffer for adaptively encoding the data with redundant information in accordance with the invention disclosed and claimed in said patent. This encoded data passes through the data modem for transmission to a remote station.

The encoded, transmitted data is received at a receiver, and processed through a data modem and a decoder. The decoder incorporates a buffer, a feedback register substantially identical to the encoder register and error test and correction circuitry, all for the purpose of detecting and correcting errors in the received message. As explained in U.S. Pat. No. 3,506,961, the encoding and decoding circuitry may be modified by an adaptive parameter "$a$" to alter the block length of the data being encoded and decoded and thereby adjust the error correction capabilities of the system without varying the percentage redundancy of the data being transmitted.

BRIEF DESCRIPTION

In accordance with the present invention there is disclosed a system for controlling the processing of data through such encoders and decoders to effectively allow for the efficient use of the capabilities of such an adaptive forward error correction data transmission system.

Thus, in accordance with the present invention, there is disclosed a system in which blocks of a.k information bits are adaptively encoded by generating $a.r$ redundant data bits as a function of the $a.k$ information data bits in accordance with a selected error correction code. The resulting $a.k + a.r$ or $a.n$ data bits are transmitted over a data transmission channel are received and decoded to detect and correct errors that may have occurred during data transmission.

In one embodiment of a system incorporating the present invention, a block of $a.k$ information data bits is encoded by initially being read out of an input/output device into a first buffer capable of storing a block of $a.k$ data bits for all values of "$a$" up to and including "$a_m$," the maximum value of "$a$," at a relatively slow bit rate governed by the input/output device. The $a.k$ data bits stored in the first buffer are read into an encoding feedback shift register for generation of the $a.r$ redundant check data bits and are also connected to the modem for transmission. The $a.r$ data bits generated in the encoding feedback shift register are "tacked on" to the end of the $a.k$ bits for transmission. Thus, the transmitted block of data includes $a.n$ data bits.

During encoding and transmission, which occur at much higher bit rates than the bit rate of the data bits and from the input/output device, the $a.k$ data bits in the first buffer are recirculated in the event retransmission is required. During this interval, a second block of $a.k$ data bits is read out of the input/output device into a second buffer substantially identical to the first buffer. Since the bit rate at which the data is read out of the input/output device into either of the buffers is slower than the bit rate at which encoding is effected, and is slower than data transmission speed, encoding, transmission, error detection and correction and acknowledgement of the transmission of the first word all occur before the second word id completely read into the second buffer.

Thus, by the time a second block of $a.k$ data bits is completely read into the second buffer the system is prepared to encode and transmit a second block of $a.n$ data bits.

A third buffer having $a.k$ stages is utilized during transmission for processing control signals which the decoder sends back to the encoder. These control signals: (1) indicate the previous block of data bits has been received correctly; or at least has been corrected; (2) request a change in the value of the adaptive parameter "$a$;" (3) request retransmission of the block of data in the event that it was uncorrectable; or (4) perform any other function desired.

As explained in the aforementioned U.S. Pat. No. 3,506,961, the feedback encoding/decoding register includes a number of stages interconnected in accordance with the error correcting code being utilized. Each of the stages of the register is interconnected by interstage EXCLUSIVE-OR gates or MOD-2 adders. In accordance with one aspect of the present invention each such stage includes a number of "substages" determined by "$a_m$," the maximum value of the adaptive parameter. The number of substages utilized is a function of "$a_i$" the particular value of "$a$" being utilized at the time.

In order to operate the register at various values of the adaptive parameter "$a$," the register is shifted at high internal processing speed a number of times between each group of "$a_i$" bits received at the register input. The number of such high speed shifts is equal to the difference between "$a_m$" and "$a_i$." Thus, relatively simple hardware can be utilized for the register with the variations in the adaptive parameter "$a$" being effected simply by varying the number of high speed shifts that occur between each group of "$a_i$" bits read into the register and by adjusting the total number of bits read into the buffer from the input/output device.

In another embodiment, the second buffer may be smaller than the first buffer in order to reduce the amount of hardware required. In this embodiment, the second buffer is capable of storing entire blocks of $a.k$ data bits up to $a_j.k$ data bits. For example, the second buffer may be constructed with a maximum capability of storing $a_j.k = a_m.k/2$ data bits.

In this configuration, for example, if the system is operating to encode $a_m.k$ data bits, the internal processing and transmission bit rate is sufficiently faster than the input/output device output data bit rate so that transmission and error correction occurs by the time $a_m.k/2$ data bits has been read into the second buffer. At this point, if the prior transmitted block of data bits has been received correctly, or has been corrected, the second half of the block of $a_m.k$ data bits is read into the lower half of the first buffer, while the first half of this block of data is read at internal processing speeds into the upper half of the first buffer. Thus, under circumstances where the noise conditions in the transmission channel are such that the adaptive factor "$a$" is at its maximum value, the system utilizes both the first and second buffer thereby reducing the total number of stages required in the second buffer.

This system is capable of duplex operation, i.e., capable of acting as both an encoder and decoder. Upon receipt of a block of encoded data, the incoming data block is processed simultaneously through selected buffers and the decoding register. If desirable, two buffers may be used in conjunction during receiving operations to reduce the number of stages required in any one buffer.

Thus, in accordance with the present invention, data may be processed through the adaptive forward error correction and data transmission system of the aforementioned U.S. Pat. No. 3,506,961, efficiently with a minimum hardware and at rapid rates conducive for use with such an efficient forward error correcting data transmission system with the resultant of an ability to transmit data and forward error correct at the desired high speeds and low cost.

Numerous other advantages and features of the present invention will become apparent from the following detailed description of the invention and of one embodiment thereof, from the claims and from the accompanying drawings in which each and every detail shown is fully and completely disclosed as a part of this specification, in which like numerals refer to like parts.

Figure 1:
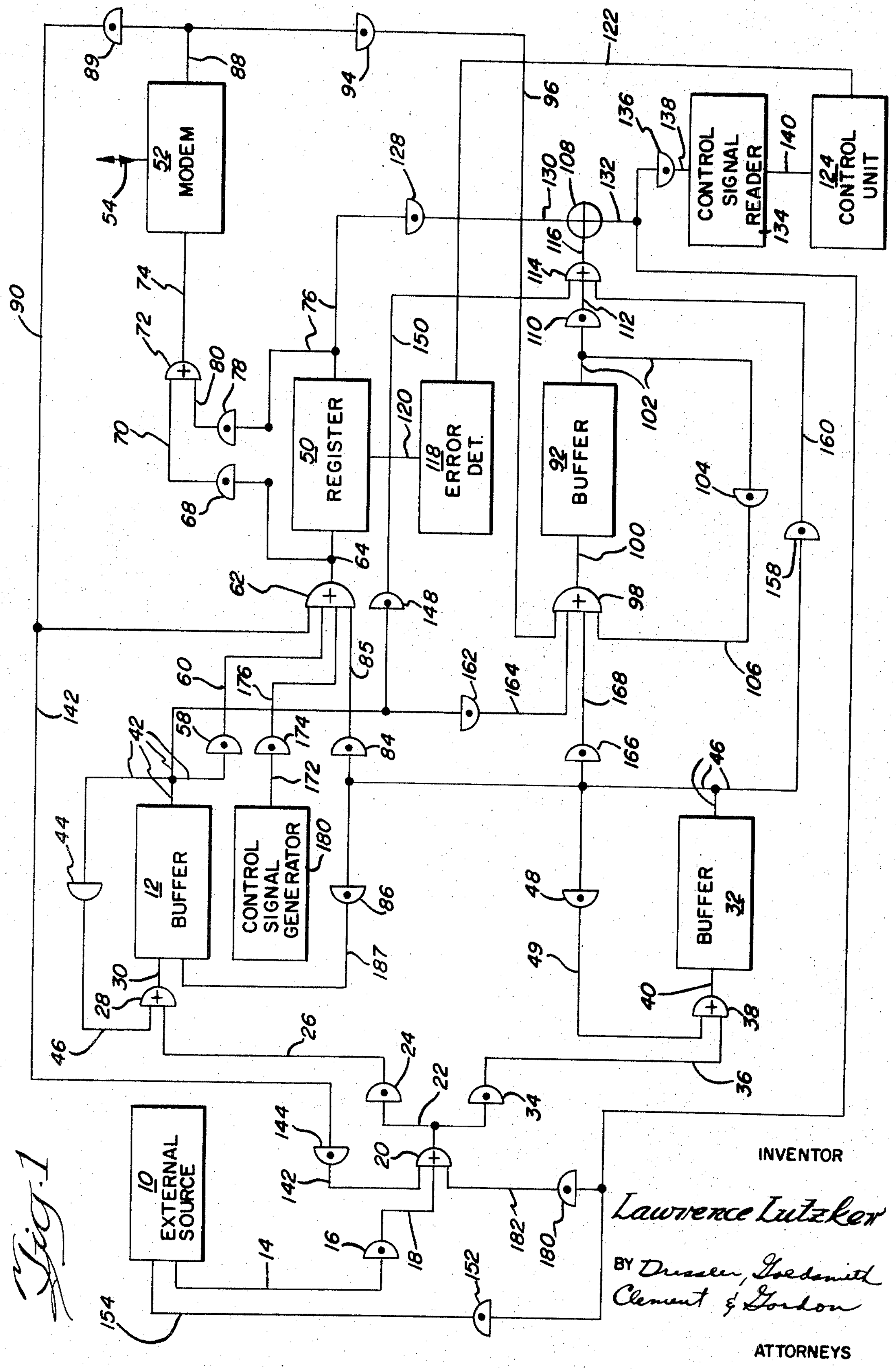
FIG. 1 is a block diagram of the system in accordance with the present invention.

In the drawings, FIG. 1 shows a block diagram of one embodiment of a system for encoding data bits for transmission and for decoding data bits after transmission. In the encode/transmit mode, a block of $a.k$ information data bits from an input/output device or external data source 10, such as a teletype terminal, cathode ray tube terminal, or other suitable data source, is selectively read into a first digital data buffer storage device 12, over external source output line 14, external source output control AND gate 16, line 18, OR gate 20, line 22, first buffer selection AND gate 24 line 26, first buffer input OR gate 28 and line 30. Similarly, a block of $a.k$ information bits may be read from the external data source 10 into a second digital data buffer storage device 32 over external source output line 14, AND gate 16, line 18, OR gate 20, line 22, a second buffer selection AND gate 34, line 36, a second buffer input OR gate 38 and line 40.

Data stored in the first buffer 12, may be recirculated over first buffer output line 42, first buffer recirculating AND gate 44, line 46, OR gate 28 and line 30. Data bits stored in the second buffer 32, may be recirculated over second buffer output line 46, second buffer recirculating AND gate 48, line 49, IR gate 38 and line 40.

In the encode/transmit mode, the block of $a.k$ data bits in the buffer 12 is simultaneously read out of the buffer into an encoding/decoding feedback shift register 50 for generation of the $a.r$ redundant check data bits as a function of the $a.k$ data bits and to a modem 52 for transmission therefrom on modem transmit/receive line 54. The $a.k$ data bits are read out of buffer 12 into the register 50 over first buffer output line 42, feedback register first input AND gate 58, line 60, feedback register input OR gate 62 and feedback register input line 64.

The $a.k$ data bits are simultaneously read into the modem 52 from register input line 64, modem first input AND gate 68, line 70, modem input OR gate 72 and modem input line 74. When the $a.k$ date bits have been read out of the buffer 12, during which time, the recirculating AND gate 44 may be closed to allow recirculation and continued storage of the $a.k$ data bits within the buffer 12, the $a.r$ data bits generated in the feedback shift register 50 are read out of the register over register output line 76, modem second input AND gate 78, line 80, modem input OR gate 72 and modem input line 74.

In a similar fashion, $a.k$ data bits stored in buffer 32 may be read into the register 50 and modem 52 over line 46, feedback register second input AND gate 84, line 85, input OR gate 62 and input line 64. During this time, the $a.k$ data bits in buffer 32 may be retained by recirculation through the recirculating AND gate 48.

At least one of the two buffers 12, 32 is capable of storing $a.k$ data bits for all values of "$a$" including "$a_m$," the maximum value of "$a$." In the system illustrated in FIG. 1, for example, at least buffer 12 will have this capability. The second buffer 32 may be the same configuration as buffer 12 or, alternatively, can have the capability of storing a maximum of $a_j.k$ data bits where "$a_j$" is a value of "$a$" less than "$a_m$." This design configuration reduces the size, and, therefore, the cost of buffer 32.

If the buffer 32 is so constructed and if the system is operating, for example, at "$a_m$," it is quite clear that the buffer will not be able to store the entire block of $a_m.k$ data bits being read out of the external data source 10. In this event, when the first "$a_j$" data bits have been read into the buffer 32, the remaining $(a_m-a_m)lk$ data bits are read into the buffer 12 while simultaneously, the $a_j.k$ data bits in buffer 32 are also read into the buffer 12 over output line 46, first buffer auxiliary input AND gate 86 and line 87.

The data on modem transmit/receive line 54 includes a.n data bits composed of the $a.k$ data bits from either the buffer 12 or the buffer 32 and the $a.r$ data bits generated in the feedback register 50 which are effectively "tacked on" to the $a.k$ data bits.

After transmission, the receiver/decoder generates and transmits back to the encoder/transmitter a control signal in the form of a block of $a.n$ control bits, as will be described below in connection with the description of this system in the decode/receiver mode. The control signal acknowledges satisfactory reception of the transmitted data, or indicates that the transmitted date was received with uncorrectable errors and retransmission thereof is required. In addition, the control signal may request a change in the value of the adaptive parameter "$a$" to adjust the length of the data block as described in more detail in the aforementioned Abramson et al. U.S. Pat. No. 3,506,961.

The received block of a.n control bits is read into the modem 52 over transmit/receive line 54. The block of received $a.n$ control bits is decoded for detection and correction of any errors that may have occurred therein by reading all a.n data bits into the encoding/decoding register 50 over modem output line 88, modem first output AND gate 89, line 90, register input OR gate 62 and line 64. Simultaneously, the first $a.k$ bits in the received $a.n$ control bits, the information containing portion of the control bits, are read into a third buffer 92 over modem output line 88, modem second output AND gate 94, line 96, third buffer input OR gate 98 and third buffer input line 100.

As in the case of the other buffers, data bits in the third buffer 92 may be recirculated by reading the data out on line 102 through third buffer recirculating AND gate 104, line 106, OR gate 98 and line 100.

After all of the $a.n$ data bits have been read into the feedback register 50, any errors occurring in the received data bits are corrected by an error correction MOD–2 adder 108. The received $a.k$ data bits are read out of third buffer 92 into MOD-2 adder 108 over buffer output line 102, MOD-2 adder first input AND gate 110, line 112, MOD-2 adder input OR gate 114 and line 116. As explained in more detail in the aforementioned Abramson et al. U.S. Pat. No. 3,506,961, errors in the received block of data bits are detected by an error detection and indicating circuit 118 which is connected to the encoding/decoding register 50 over line 120. Error detection and indicating circuit 118 generates an output on line 122 which is connected to the control unit 124 to provide an indication as to whether any errors occurred in the received message, and whether and when such errors are correctable all as more fully disclosed in the aforementioned Abramson et al. patent.

When a correctable error occurs, and is in position to be corrected, a bit is read out of the register 50 into MOD-2 adder 108, over line 76, MOD-2 adder second input gate 128, line 130 to correct the bit then being read out of the third buffer 92. The output 132 of the MOD-2 adder 108, the corrected $a.k$ data bits or the uncorrectable $a.k$ data bits, is read into the control signal reader 134, through reader input AND gate 136 and line 138. The control signal reader 134 generates an output on line 140 to the control unit 124 indicative of the content of the received control signal. The control unit 124 responds to this output to generate appropriate control signals initiating retransmission of the block of data bits just transmitted, or initiating transmission of the next block of data bits, and selecting the value of "$a$" at which such transmission and encoding will occur.

In the receive/decode mode, an incoming block of $a.n$ information data bits is read into the modem 52 over transmit/receive line 54 and out of the modem 52 into the register 50 over output line 88, modem first output AND gate 89, line 90, register input OR gate 62 and register input line 64. The first $a.k$ data bits of the received $a.n$ data bits are also read into either the first buffer 12 or the second buffer 32 through line 90, modem third output AND gate 144, line 142, OR gate 20, line 22, and either of AND gates 24 or 34 into the appropriate buffer 12, 32.

When all $a.n$ data bits have been read into the register 50, error indicating and detection circuit 118, will provide an appropriate signal to the control unit 124 on line 122 indicating whether there are any errors and if so whether they are correctable. If no error has occurred or any error that has occurred is detectable, the received $a.k$ data bits, if stored in buffer 12, will be read out of the buffer 12 through the MOD-2 adder 108 over line 42, MOD-2 second input AND gate 148, line 150, OR gate 114 and line 116. Simultaneously, as described above, if the detected errors are correctable, when an erroneous bit is read out of the buffer 12 a bit will be read out of the register 50 into the MOD-2 adder 108 over line 76, AND gate 128, and line 130 to effect correction of the error. The output 132 of the MOD-2 adder 108 is connected to the input of the external source 10 through external source input AND gate 152 and input line 154.

If the received $a.k$ data bits are stored in buffer 32, they will be read into the MOD-2 adder over line 46, MOd-2 adder fourth input AND gate 158, line 160, OR gate 114 and line 116.

Alternatively, if desired, the outputs of either the buffer 12 or the buffer 32 may be read into the MOD-2 adder 108 through the third buffer 92. In this event, the output of buffer 12 is read into the third buffer 92 over line 42, AND gate 162, line 164, OR gate 98 and line 100, while the output from the buffer 32 is read into the third buffer 92 over line 46, AND gate 166, line 168, OR gate 98 and line 100.

A control signal generator 180 may conveniently store a number of pre-selected control signals for transmission back to the transmitter/encoder in response to the received signal and to the detection and indication of the type of error present in the received signal. The output of the control signal generator 66 is read into the register 50 and modem 54 over line 172, encoding register third input AND gate 174, line 176, OR gate 62 and line 64. As described above, this signal is read simultaneously to the modem for transmission, after which the $a.r$ redundant control bits are read out of the register 50 into the modem 52 for transmission.

The received decoded signal also may be recirculated through the system by reading the output 132 of the MOD-2 adder into the buffers 12, 32, and/or 92 over line 132, AND gate 180, line 182, OR gate 20, line 22 and one of the AND gates 24, 34.

Figure 2:
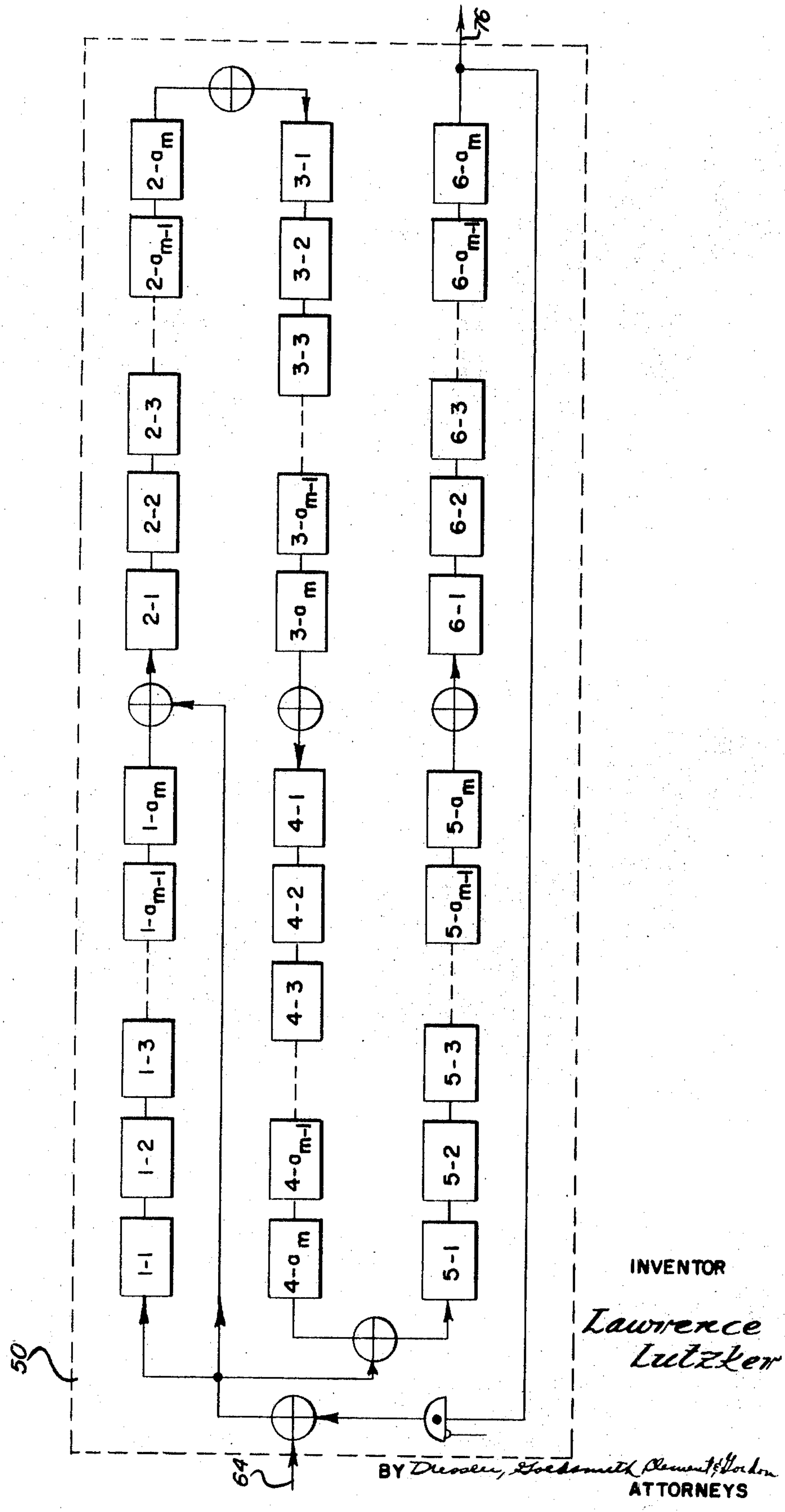
FIG. 2 is a block diagram of one embodiment of a shift register for use in the system of FIG. 1.

In FIG. 2 there is shown one embodiment of a feedback register suitable for use in the system of FIG. 1. The register of FIG. 2 is shown connected to encode a word in accordance with the disclosure of the Abramson et al. U.S. Pat. No. 3,506,961. The register includes six stages interconnected by interstage exclusive OR gates. The output of the sixth stage is connected back to the input of the first stage through an input exclusive OR gate the other input of which is connected to the line 64.

Each of the six stages includes "$a_m$" substages for encoding and decoding blocks of data bits for all values of "$a$." At values of "$a$" less than "$a_m$," for example, "$a_i$," the system operates to read into the register "$a_i$" bits. The register is then shifted at high speed "$a_m$" – "$a_i$" times before the next "$a_i$" bits are read into the register. These high speed shifts effectively read O's into the "$a_m$" – "$a_i$" low order substages of each stage which are ignored during subsequent operation of the system as a result of system timing control. Thus, the encoding/decoding register may be readily adapted to operate at all values of "$a$" simply by causing the register to shift at high speed "$a_m$" – "$a_i$" times after every "$a_i$"th bit is read into the register.

It should be understood, that each of the AND gates and other system components include, in addition to the inputs shown, an additional control input for receiving control pulses from the control unit. Other units such as the shift register may also receive appropriate control pulses. It should also be understood that the system of FIG. 1 may include suitable components for stripping extraneous control bits, e.g., start bits, stop bits and parity bits from the data read out of the external source 10 on line 14 and for re-inserting these bits into the data being read into the external source 10 on line 154.

Figure 3:
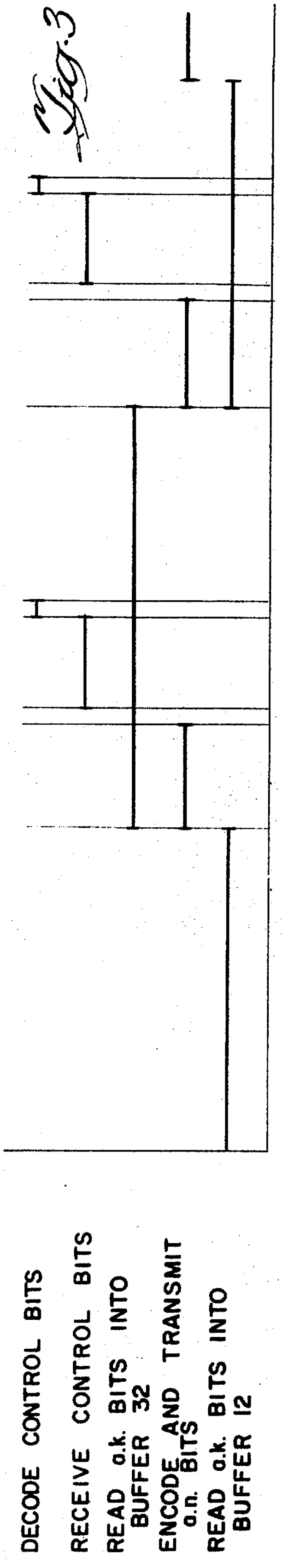
FIG. 3 is a timing diagram of the system operating in the encode/transmit mode.
Figure 4:
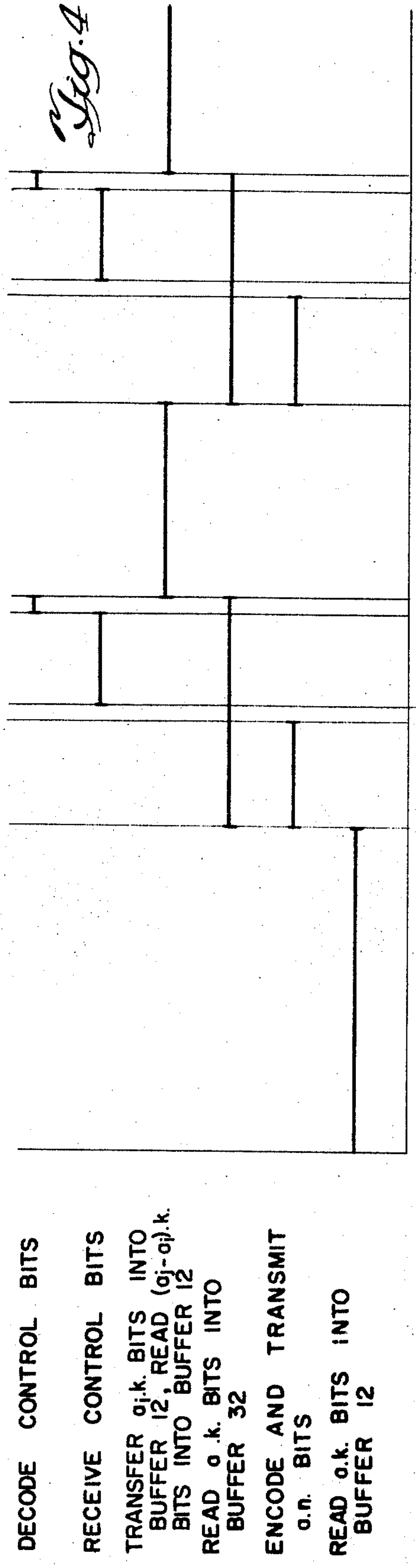
FIG. 4 is a timing diagram of an alternative operation of the system in the encode/transmit mode.
Figure 5:
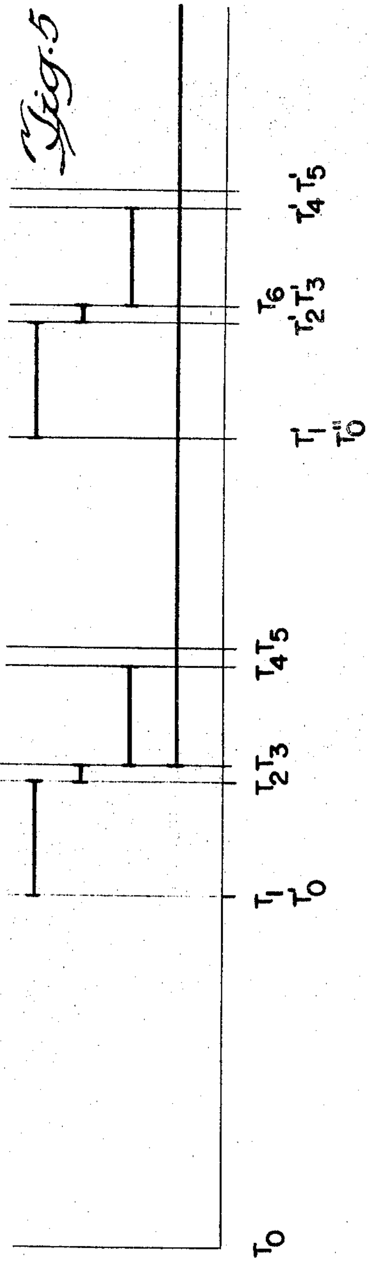
FIG. 5 is a timing diagram of the system in the receive/decode mode.

The operation of the system of FIG. 1 should be considered in connection with the timing diagrams of FIGS. 3, 4 and 5. In this regard, it should be understood that the bit rate of data read out from the external data source 10 is substantially slower than the bit rate of internal processing of the data within the system and the bit rate for data transmission. For example, in the case where the external source 10 takes the form of a C.R.T. or 30 character per second printer, typical output bit rates are normally about 330 bits per second from which the bit time ($b$) of the output from the terminal can be determined to be about 3 milliseconds per bit. Internal processing speeds of the system may be, for example, about 19.2 killibits per second, from which the processing bit time ($p$) can be determined to be about 0.05 millisecond per bit. Typically data transmission rates may be about 1,200 bits per second, which result in transmission bit times ($t$) of about 0.83 milliseconds per bit.

The above bit rates and bit times are set forth above for illustrative purposes only, and it should be fully understood that the system of the present invention is adaptable for processing data utilizing bit rates other than these specific examples.

In operation as an encoder, the $a.k$ bits to be encoded are read out of the external data source 10 into the buffer 12 during the time interval $t_0 - t_1$, equal to $a.k.b$. At the end of time interval $t_1$, a.k information data bits have been read into the buffer 12. For purposes of illustration, time $t_1$ coincides with time $t_o'$, the point in time when reading of a second block of $a.k$ information data out of external source 10 into the second buffer 32 is initiated.

Simultaneously at time $t_1$, the $a.k$ bits stored in first buffer 12 are read out of the buffer, (and recirculated through recirculating AND gate 44) into the feedback encoding shift register 50 and into the modem 52 for transmission. After the *a.k* bits have been read out of the buffer 12, the *a.r* bits generated in the register 50 as a function of the *a.k* bits are read out of the register 50 into the modem 52 for transmission. The time required to process and transmit these *a.n* data bits is *a.n.t* the transmission being completed at time $t_2$.

The operation of this system as a receiver/decoder will be described below, but at present, suffice it to say that the transmitted *a.n* bits are received substantially simultaneously at the receiver during the interval $t_1 - t_2$. During the interval $t_2 - t_3$, (equal to *a.n.p*) the receiver processes and decodes the received *a.n* data bits, and provides suitable indications of the existence and type of error. During the time interval $t_3 - t_4$, (equal to *a.n.t*) a suitable block of control bits is generated by the receiver and received at the transmitter/encoder.

Commencing at time $t_3$, the control bits are received and read into the modem 52 from line 54 and are immediately read out of the modem into the feedback register 50 for decoding and, simultaneously, *a.k* control bits are read into the third buffer 92.

As described more fully in the aforementioned Abramson et al. patent, once the *a.n* control bits have been read into the feedback register 50, error detection and indication circuit 118 determines by sampling the output on line 120 of the existence of any errors in the received control bit message. Immediately thereafter, during the time interval $t_4 - t_5$, the *a.k* control bits are read out of the third buffer 92 through error correction MOD–2 adder 108 and, if errors are to be corrected, the output of the register 50 is also selectively read into the MOD–2 adder 108 under control of the control unit 124 which responds to the output 122 of the error indicating circuit 118. The output of the MOD–2 adder 108 is read into the control signal reader 134 which is responsive to the control signal to generate an output 140 to the control unit 124 indicating that retransmission is required if an uncorrectable error was received, or to encode and transmit the next block, and to select the value of "*a*" at which the next block of data bits is to be transmitted. This entire processing cycle is completed by time $t_5$, well before the second block of *a.k* data bits from the external source 10 has been read into the buffer 32, since time $t_1'$, does not occur until substantially later than time $t_5$.

The second block of *a.k* data bits is read out of the second buffer 32 at time $t_1'$ and encoded as described above.

If the second buffer 32 is designed to store only $a_j.k$ bits, less than *a.k* data bits for all values of "*a*," and "$a_i$," the value of "*a*" at which the block of data being read into the buffer 32 is greater than "$a_j$" the storage capacity of the buffer 38, encoding of the second block of data is modified as follows:

Referring to FIG. 4, when the second buffer 32 is so constructed, it will be noted that time $t_5$ occurs before $a_j.k$ data bits have been read into the buffer 32. Thus, if this block of data bits is to be transmitted, the data in buffer 32 is transferred to buffer 12 over line 46, AND gate 86 and line 187 at high speed so that the bit in buffer 32 is the last bit standing at the input of buffer 12. The remaining data bits of that block are read into the buffer 12 through the normal input circuit immediately following the data transferred from buffer 32 to buffer 12.

In operation in the receive/decode mode, a block of *a.n* data bits is received at the modem 52 over transmit/receive line 54. The *a.n* data bits are read out of the modem 52 into the feedback register 50 and *a.k* bits are read into either of the two buffers 12, 32. All *a.n* data bits are received during time interval $t_1 - t_2$.

Errors present in the received block of *a.n* data bits are indicated by error indicating and detection circuit 118 which provides an output on line 122 to the control unit 124. If the error is correctable, as described in the aforementioned Abramson et al. patent, the *a.k* bits are read out of the buffer 12 or the buffer 32, as the case may be, through the error correction MOD–2 adder 108 simultaneously with the selective read out of the bits from the feedback register 50 to correct any errors and into the data source 10.

The number of errors can be determined and in response to this information, the control unit supplies appropriate control pulse to control signal generator 180 to select the appropriate control signal which is encoded by reading it into the feedback register 50 and modem 52 as described above, during the time interval $t_3 - t_4$. Simultaneously, commencing at time $t_3$, if the received block of *a.n* data bits was correct or correctable, the information is read out of the MOD–2 adder through AND gate 116 to a suitable external data source 10. If desirable, the a.n data bits may be recirculated and through AND gate 180 for reprocessing through the system.

From the foregoing, it will be observed that numerous variations and modifications may be effected without departing from the true spirit and scope of the novel concept of the invention. It is, of course, intended to cover by the appended claims all such modifications as fall within the scope of the claims.

What is claimed is:

1. In an adaptively coded forward error correcting digital data communications system having an encoder for adaptively encoding a block of *a.k* data bits for transmission as a.n data bits in accordance with a selected error correcting code, wherein "*a*" is an integer $\geq$ 1 and wherein "*n*" is a block of data bits comprising "*k*" information data bits and "*r*" redundant check data bits: the improvement comprising in combination a plurality of buffer means for storing blocks of a.k data bits to be encoded, at least one of said buffer means adapted to store *a.k* data bits for all values of "*a*" up to and including "$a_m$," the maximum value of "*a*," additional buffer means for storing blocks of control bits, feedback register means responsive to each block of *a.k* data bits read into said feedback register means to generate as a function thereof a block or *a.r* data bits in accordance with said selected error correcting code and responsive to each block of *a.n* data bits read into said feedback register means to detect the presence or absence of errors occurring therein, error indicating means coupled to said feedback register means for providing outputs indicative of the detected presence or absence of errors and of the type of any detected errors, control means for selectively reading a first block of a.k data bits into a selected one of said plurality of buffer means, for subsequently reading out said first block of *a.k* data bits from said selected one of said buffer means into said feedback register means and to an output for transmission, for thereafter reading out said first block of *a.r* data bits from said feedback register means to said output for transmission, and for selectively reading another block of *a.k* data bits into another selected one of said plurality of buffer means while said one block of *a.n* data bits is being read out to said output for transmission, said control means being responsive to said block of control bits received after transmission of said a.n data bits for reading said block of control bits into said additional buffer means and into said feedback register means, and error correcting means, said control means being responsive to the outputs of said error indicating means for selectively reading the control bits from said additional buffer means and the bits in said feedback register means therefrom into said error correcting means to correct errors in said block of control bits, said control means being additionally responsive to said corrected control bits for selectively and alternatively enabling retransmission of said first block of *a.n* data bits or encoding of said other block of *a.k* data bits, and selection of "$a_i$" the selected value of "*a*" for encoding each of said blocks of *a.k* data bits.

2. In a system as claimed in claim 1 wherein said feedback register means includes a plurality of stages equal in number to the value of "*r*," wherein each of said "*r*" stages includes a plurality of substages equal in number to "$a_m$," and including a MOD–2 adder means interconnecting said plurality of stages in accordance with said selected error correcting code.

3. In a system in accordance with claim 2 wherein said control means generates "$a_m$" minus "$a_i$" timing pulses, said control means being responsive to each "$a_i$" bits read into said encoder register means for applying said timing pulses to said encoder register means to advance the bits in each of said "*r*"

stages through "$a_m$" minus "$a_i$" substages before subsequent bits are read into said encoder register means.

4. In a system as claimed in claim 1 wherein said other buffer means is adapted to store *a.k* bits for all values of "*a*" up to $a_j.k$ bits, wherein "$a_j$"<"$a_i$" $\leq$ "$a_m$," and wherein said control means is responsive to the first $a_j.k$ data bits of a block of $a_i.k$ data bits having been read into said other buffer means for transferring said $a_j.k$ bits from said other buffer means to said one encoder buffer means and for reading the remaining "$a_i$"–"$a_j$" data bits in said block of $a_i.k$ data bits into said one buffer means.

5. In an adaptively coded forward error correcting digital data communications system having an encoder for adaptively encoding a block of a.k data bits for transmission as a.n data bits in accordance with a selected error correcting code, wherein "*a*" is an integer $\geq 1$ and wherein "*n*" is a block of data bits comprising "*k*" information data bits and "*r*" redundant check data bits and including a decoder for adaptively decoding in accordance with said selected error corrected code, said block of a.n data bits received after transmission: the improvement comprising in combination a plurality of buffer means for storing blocks of *a.k* data bits to be decoded, feedback register means responsive to each block of *a.n* data bits read into said feedback register means to detect the presence or absence of errors occurring therein and responsive to each block of *a.k* data bits read into said feedback register means to generate as a function thereof a block of *a.r* data bits in accordance with said selected error correcting code, error indicating means coupled to said feedback register means for providing outputs indicative of the detected presence or absence of errors and of the type of any detected errors, control means responsive to said received block of *a.n* data bits for reading *a.k* data bits therefrom into a selected one of said plurality of buffer means and for reading said block of received a.n data bits into said feedback register means, error correcting means, said control means being responsive to the outputs of said error indicating means for selectively reading said *a.k* data bits from said selected buffer means and selected bits from said feedback register means into said error correcting means to correct errors in said *a.k* data bits, and control bit means for selectively generating blocks of control bits, said control means being additional responsive to said error indicating means for reading out a selected block of control bits from said control bit generating means into said feedback register means to an output for transmission, and for thereafter reading out a block of redundant control bits from said feedback register means to said output for transmission.

6. In a system as claimed in claim 1, including means for adaptively decoding a block of *a.n* data bits after transmission in accordance with said selected error correcting code to extract said *a.k* data bits therefrom and to correct any errors occurring therein, wherein said control means is responsive to a first block of *a.n* data bits received at an input for reading a first block of *a.k* data bits forming a part thereof into a selected one of said buffer means and for reading said *a.n* data bits into said feedback register means, wherein said control means is further responsive to the output of said error indicating means after said received *a.n* data bits have been read into said feedback register means to selectively read out said *a.k* data bits from said one buffer means and selected bits from said feedback register means through said selective error correction means, to correct errors in said *a.k* data bits.

7. An adaptive forward error correcting data transmission system for encoding and decoding adaptively variable length blocks of digital data bits in accordance with a selected error correcting code comprising a plurality of buffer storage means for serially receiving a plurality of information data bits, a feedback shift register for generating redundant check data bits as a function of said information data bits in accordance with said code, said register having a number of stages corresponding to the minimum number of redundant check data bits to be generated, said stages including a plurality of substages corresponding to the maximum number of redundant check data bits to be generated, each of said stages including an equal number of substages, means for serially feeding information data bit of selected adaptively variable block length to selected ones of said buffer storage means, means for encoding the information data bits stored in one of said buffer storage means while other information data bits are being fed into an alternate one of said buffer storage means, said encoding means including means for feeding the output of said one buffer storage means into said feedback shift register and simultaneously to a modem for transmission, and means for subsequently feeding the generated redundant data bits from said feedback shift register to said modem, and means for adaptively changing the block length of said digital data bits including means for feeding a selected portion of said block of information data bits into said feedback shift register, and means for shifting said feedback shift register a selected number of times during the interval between each portion of said information data bits until the first bit of each portion is in the last substage in the corresponding stage of said shift register.

8. A system as claimed in claim 7 including means for decoding variable length blocks of digital data bits in accordance with said selected error correcting code including means for simultaneously reading a block of information data bits from said modem into one of said buffer storage means and into said feedback shift register, means responsive to the data bits in said feedback shift register for generating outputs indicative of whether said received data bits contain no errors, contain correctable errors or contain uncorrectable errors, control means responsive to said no error outputs for reading the data bits out of said buffer storage means without change, responsive to said correctable error outputs for selectively combining the data bits read out of said buffer storage means and with data bits read out of said feedback register to correct the correctable errors, and selectively responsive to said outputs, for generating variable length blocks of control bits acknowledging satisfactory transmission of the data bits, selectively requesting adaptive change of the block length of said data bits for subsequent transmission, and requesting retransmission of said variable length block of digital data bits.

* * * * *